(12) United States Patent
Keightlley (10) Patent No.: US 11,701,717 B2
(45) Date of Patent: Jul. 18, 2023

(54) HOLE CUTTER HAVING PLUG EJECTION AND METHOD THEREOF

(71) Applicant: Kym Keightlley, Adelaide (AU)

(72) Inventor: Kym Keightlley, Adelaide (AU)

( * ) Notice: Subject to any disclaimer, the term of this patent is extended or adjusted under 35 U.S.C. 154(b) by 0 days.

(21) Appl. No.: 17/313,042

(22) Filed: May 6, 2021

(65) Prior Publication Data

US 2021/0346966 A1 Nov. 11, 2021

(30) Foreign Application Priority Data

May 8, 2020 (AU) .................................. 2020901468

(51) Int. Cl.
*B23B 51/04* (2006.01)

(52) U.S. Cl.
CPC ...... *B23B 51/0426* (2013.01); *B23B 51/0453* (2013.01); *B23B 51/0473* (2013.01)

(58) Field of Classification Search
CPC ............ B23B 51/0426; B23B 51/0453; B23B 51/0473
See application file for complete search history.

(56) References Cited

U.S. PATENT DOCUMENTS

| | | | | |
|---|---|---|---|---|
| 5,813,802 A * | 9/1998 | Ajimi | ................. | B23B 51/0426 175/403 |
| 6,341,925 B1 * | 1/2002 | Despres | ............. | B23B 51/0453 408/239 R |
| 7,097,397 B2 * | 8/2006 | Keightley | ........... | B23B 51/0473 408/239 R |
| 8,366,356 B2 * | 2/2013 | Novak | ................ | B23B 51/0473 408/239 R |
| 8,721,236 B2 * | 5/2014 | Kazda | ................. | B23B 51/0473 408/239 R |
| 9,233,424 B2 * | 1/2016 | Grolimund | ......... | B23B 51/0473 |
| RE46,103 E * | 8/2016 | Novak | ................... | B23B 51/04 |
| 9,550,237 B2 * | 1/2017 | Keightley | ........... | B23B 31/1071 |
| 9,839,966 B2 * | 12/2017 | Batho | ................ | B23B 51/0426 |
| 10,532,412 B2 * | 1/2020 | Ward | .................. | B23B 51/0426 |
| 2014/0314505 A1 * | 10/2014 | Viuf | .................... | B23B 51/0426 408/68 |
| 2019/0151959 A1 * | 5/2019 | Ho | ...................... | B23B 51/0473 |

FOREIGN PATENT DOCUMENTS

TW M525805 U * 7/2016

\* cited by examiner

*Primary Examiner* — Eric A. Gates
(74) *Attorney, Agent, or Firm* — Richard Gerald Topolewski (57) ABSTRACT

A hole cutting tool with plug ejection includes a hole saw having a first central bore and an arbor having a second central bore along a central axis. The arbor is configured at one end to be coupled to a rotational drilling machine, and at the other end to be attached to the hole saw in a first cutting position and detached from the hole saw in a second ejection position. The hole cutting tool also includes a pilot guide having an ejection shoulder. The pilot guide is slidably disposed within the second central bore of the arbor and received through the first central bore of the hole saw. The pilot guide being configured to translate along the central axis between a first drilling position and the second ejection position.

16 Claims, 7 Drawing Sheets

HOLE CUTTER HAVING PLUG EJECTION AND METHOD THEREOF

TECHNICAL FIELD

The present disclosure relates, in general, to hole cutters, and more specifically relates, to arbors, hole cutters and related method facilitating ejection of a plug out of the hole cutter.

BACKGROUND

Hole cutters are used to cut round holes in materials to enable fitment of various fittings, for example, fitment of door lock in a door, fitment of cables in switchboards, fitment of conduits in ground pits, etc. Hole cutters typically include a ring-shaped hole saw having teeth formed on an open end, an arbor attached to the other end of the hole saw, and a pilot guide retained within the arbor. The arbor is mounted in a chuck of a drilling machine and the pilot guide starts the hole cutting process by drilling a hole and thus providing an anchor or pilot guide to the hole saw. Another method that may be employed is to pre-drill a hole with a separate drill bit and then use a solid pilot guide with no drilling point which may be inserted into the hole to guide the hole saw. This is common in hard material like concrete, porcelain and ceramics.

Waste material is generated during hole cutting and often binds inside the hole saw. This waste material is generally referred to as a core, a slug, or a plug, and tends to jam inside the hole cutter. An aggravating problem encountered with hole cutters is the removal of plug, particularly after cutting thicker materials.

U.S. Pat. No. 5,435,672 discloses an elongated arbor having a threaded shank portion along which a hole saw travels from a first cutting position to a second eject position to eject the plug. However, the arbor requires an additional length to allow the hole saw to travel back towards a drill chuck during plug ejection. This additional length hinders operation of the hole saw when used in confined areas such as cupboards, switchboards, ground pits, etc. This causes an increase in manufacturing cost, and thus an overall cost of the hole cutter. Further, this additional length can cause rotational runout of the arbor, which is undesirable when cutting circular holes.

SUMMARY

According to one aspect of the present disclosure, a hole cutting tool is provided. The hole cutting tool includes a hole saw having a first central bore and an arbor having an arbor body defining a second central bore along a central axis. The arbor is configured at one end to be coupled to a rotational drilling machine, and at the other end to be attached to the hole saw in a first cutting position and detached from the hole saw in a second ejection position. The hole cutting tool also includes a pilot guide having an ejection shoulder. The pilot guide is slidably disposed within the second central bore of the arbor and received through the first central bore of the hole saw. The pilot guide is configured to translate along the central axis between a first drilling position and the second ejection position.

Further, the arbor includes locking means to rotationally secure the pilot guide in the second central bore as well as to prevent longitudinal movement of the pilot guide along the central axis. In the first drilling position, the locking means engages with the pilot guide and in the second ejection position, the locking means disengages from the pilot guide to allow a translational movement of the pilot guide between the first drilling position and the second ejection position. When the pilot guide is in the second ejection position, movement of the hole saw from the second ejection position to the first cutting position causes the ejection shoulder to abut waste material in the first central bore to eject the waste material from the hole saw.

According to another aspect of the present disclosure, a method of operating a hole cutting tool is provided. The method includes slidably receiving a pilot guide within a bore of an arbor along a central axis. The pilot guide is configured to translate along the central axis between a drilling position and an ejection position. The method also includes detachably coupling a hole saw to the arbor. The hole saw is configured to translate onto the pilot guide along the central axis. The method also includes translating the pilot guide and the hole saw away from the arbor along the central axis. The method includes actuating a locking tongue from a first position to a second position. In the first position, the locking tongue engages with the pilot guide to prevent a translational and rotational movement of the pilot guide in the drilling position, and in the second position, the locking tongue disengages from the pilot guide to allow a translational movement of the pilot guide between the drilling position and the ejection position. The method also includes actuating the locking tongue to a third position. In the third position, the locking tongue engages with the pilot guide to prevent a translational movement of the pilot guide in the ejection position. The method further includes translating the hole saw along the pilot guide and along the central axis towards the arbor, when the pilot guide is in the ejection position and the locking tongue is in the third position, to eject the plug from the hole saw.

These and other aspects and features of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof) may be obtained with reference to the detailed description of the embodiments along with the following drawings, in which.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Aspects of the present disclosure are directed to a hole cutting tool having a plug ejection feature without requiring a lengthened arbor. According to the aspects of the present disclosure, the hole cutting tool includes a hollow arbor that allow translation movement of a pilot guide and a hole saw for facilitating plug ejection, thereby preventing need for a lengthened arbor.

Figure 1:
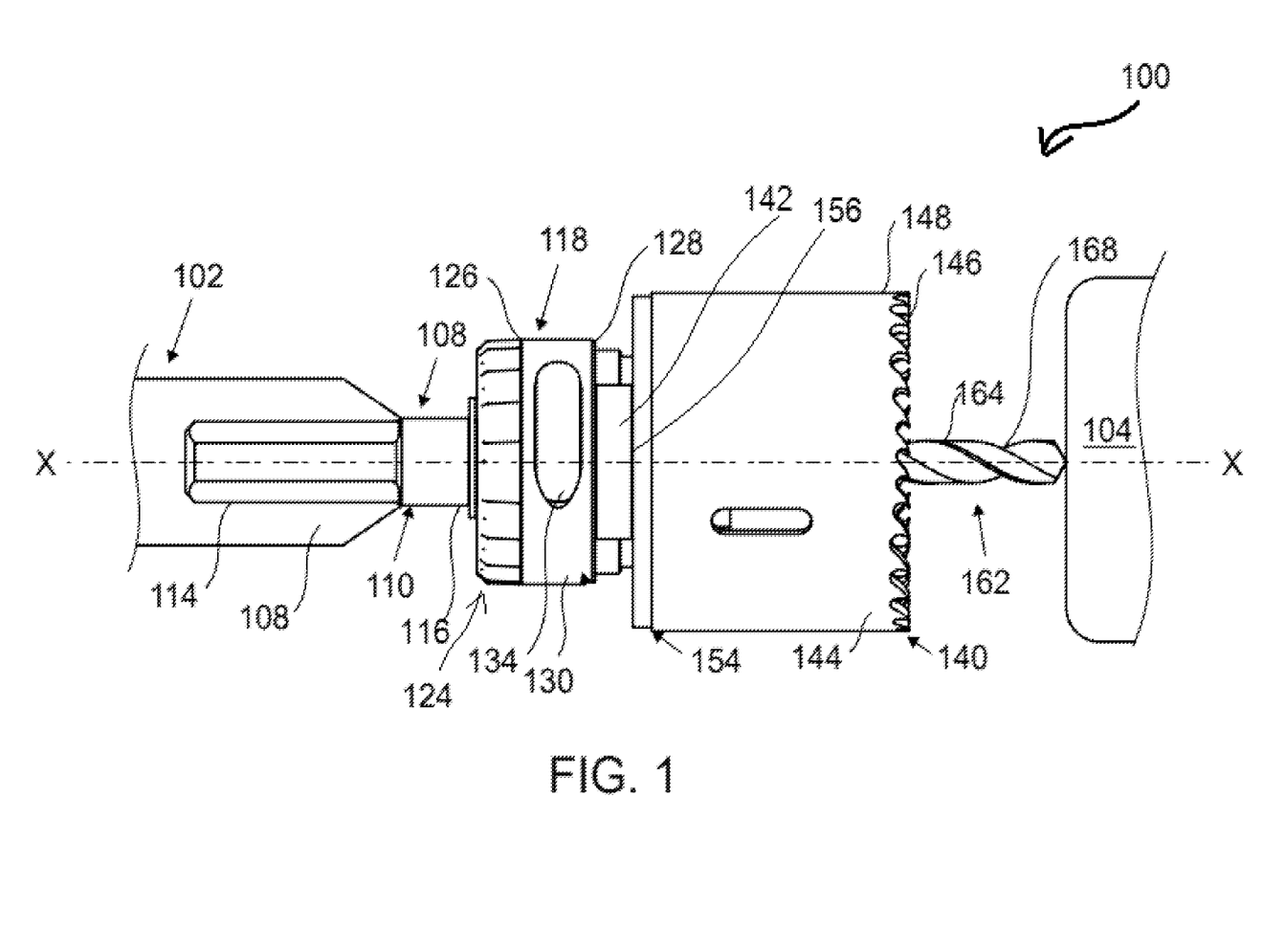
FIG. 1 is a schematic view of a hole cutting tool, in accordance with an exemplary embodiment of the present disclosure.

Referring to FIG. 1, a schematic view of a hole cutting tool 100 is illustrated. According to an aspect of the present disclosure, the hole cutting tool 100 may be implemented in a power tool 102 to drill a hole in a workpiece 104, such as a cupboard, a switchboard, a door panel, sheet metal, plastic panel, etc. The power tool 102 may be, for example, electrically, pneumatically, or hydraulically actuated to drive the hole cutting tool 100. In an embodiment, the power tool 102 is a rotational drilling machine. Upon receiving power from the power tool 102, the hole cutting tool 100 is configured to make a hole in the work piece 104 by cutting materials from the workpiece 104. The material cut, as such, may become stuck inside the hole cutting tool 100 and may be regarded as waste material 150. The term 'waste material 150' has been interchangeably referred to as the plug 150, hereinafter.

Figure 3A:
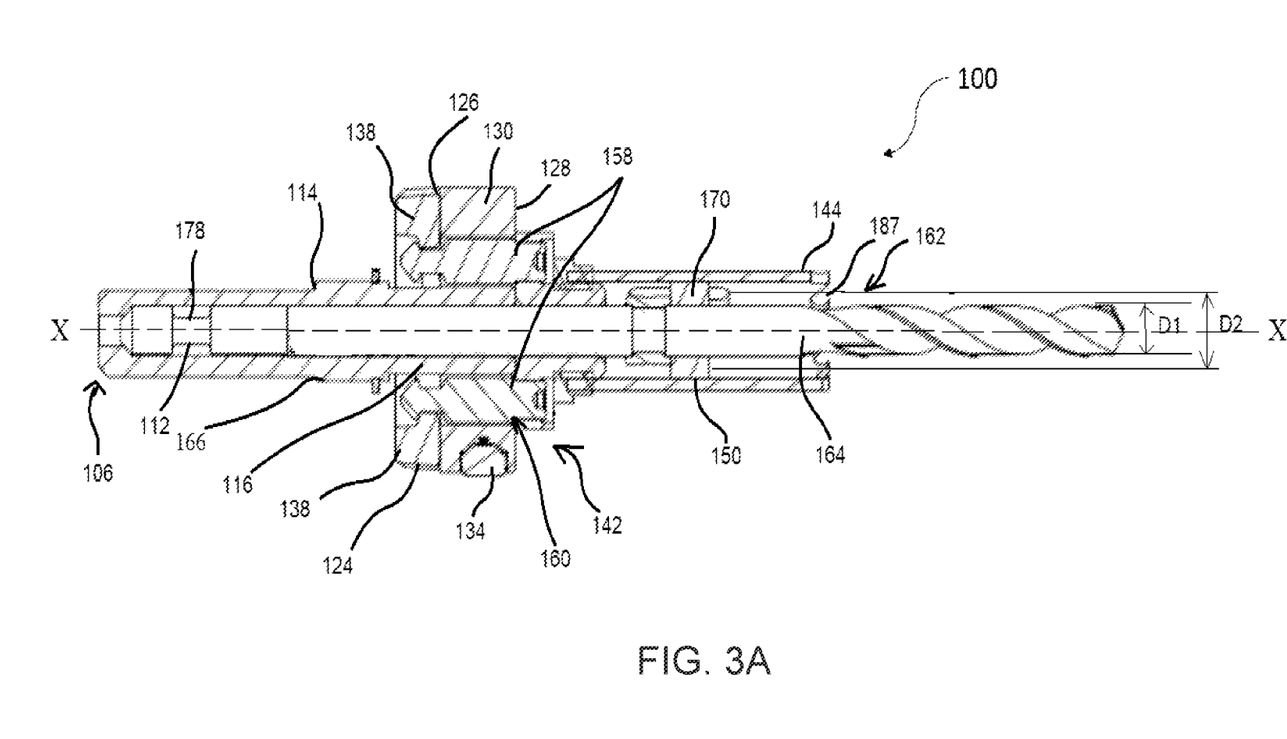
FIG. 3A is a sectional view of the hole cutting tool showing having an arbor, in accordance with an exemplary embodiment of the present disclosure.

The hole cutting tool 100 includes an arbor 106 configured to be partially received within a chuck 108 of the power tool 102. The arbor 106 includes an arbor body 110 defining a second central bore 112 (as shown in FIG. 3A) along a central axis X-X. The arbor body 110 includes a drive portion 114 and a shaft portion 116 opposite to the drive portion 114. The drive portion 114 may be configured to be inserted within the chuck 108 of the power tool 102 to translate rotation from the power tool 102. The drive portion 114 may include any cross-section, such as hexagonal, rectangular, triangular, tapered, square, etc., that may be received into corresponding shaped chuck 108 of the power tool 102. In various embodiments, the drive portion 114 may also include attachment means, such as click closure, clamps, screws, threads, etc. to allow easy attachment and detachment of the hole cutting tool from the power tool. The shaft portion 116 extends from the drive portion 114 along the central axis X-X. The shaft portion 116 has an annular cross section. Both the drive portion 114 and the shank portion 116 together define the second central bore 112 therein along the central axis X-X.

Figure 2:
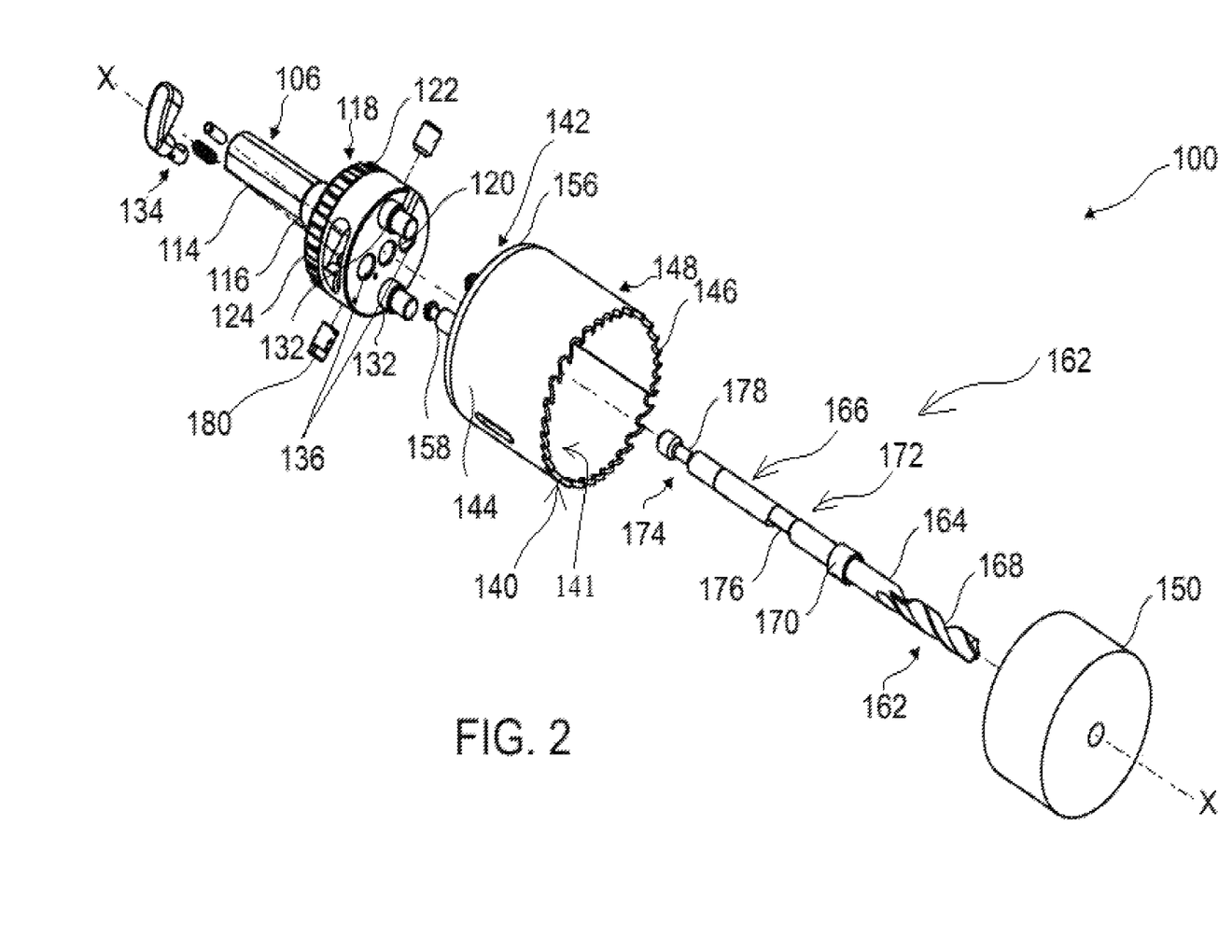
FIG. 2 shows an exploded view of the hole cutting tool having a pilot guide removed from an arbor, in accordance with an exemplary embodiment of the present disclosure.

FIG. 2 illustrates an exploded view of the hole cutting tool 100. The hole cutting tool 100 also includes an arbor head 118 extending from the shaft portion 116 opposite to the drive portion 114. It may be noted that the arbor head 118 may be contemplated as one end of the arbor 106 and the drive portion 114 may be contemplated as another end of the arbor 106. In an embodiment, the arbor head 118 includes through holes 136, a ring member 124 rotatably mounted on the shaft portion 116 of the arbor 106. The arbor head 118 includes drive pins 132 angularly spaced from each other. The drive pins 132 are radially spaced from the aperture 120 on opposing radial ends. The arbor head 118 includes an arbor head rear portion 126 configured to engage the ring member 124 to allow rotational movement of the ring member 124. In an embodiment, the ring member 124 is configured to rotate on the arbor body 110 between the first angular position and the second angular position. Further, the arbor body 130 is configured to receive a push button mechanism 134.

The hole cutting tool 100 further includes a hole saw 140 and an adapter 142 coupled to the hole saw 140. The hole saw 140 is configured to be disposed between a first drilling position (shown in FIG. 3A) and a first ejection position (shown in FIG. 4A). In the first drilling position, the hole saw 140 is configured to be coupled to the arbor head 118 of the arbor 106 through the adapter 142, and in a second ejection position, the hole saw 140 is configured to be detached from the hole saw 140.

The hole saw 140 includes a cup body 144 defining a first central bore 141. The cup body 144 includes having a cutting surface 146 formed on a first open end 148 thereof. The cutting surface 146 may be configured to cut the hole in the workpiece 104 by cutting a plug 150 from the workpiece 104 when the arbor 106 receives power from the power tool 102. In an embodiment, the cutting surface 146 may include a plurality of cutting teeth 152. In other embodiments, the cutting surface 146 may include an abrasive cutting surface.

FIG. 3A illustrates a sectional view of the hole cutting tool 100. Referring to FIGS. 2 and 3A, the ring member 124 includes a plurality of first locking shoulders 138 angularly spaced from each other and radially spaced from the aperture 120. In the first angular position, the first locking shoulders 138 are partially disposed on the through holes 136 of the arbor head 118. In the second angular position, the first locking shoulders 138 are disposed away from the through holes 136 of the arbor head 118. In an embodiment, the ring member 124 may be biased to the first angular position. The ring member 124 may be actuated to the second angular position through manual operation by an operator.

The adapter 142 is coupled to a second open end 154 of the cup body 144 of the hole saw 140. The adapter 142 is configured to detachably couple the hole saw 140 to the arbor head 118. The adapter 142 includes a disc member 156 and a plurality of pin extensions 158 extending from the disc member 156. The disc member 156 defines an opening 160 therethrough. The pin extensions 158 extend from the disc member 156 opposite to the hole saw 140. The pin extensions 158 are angularly spaced apart from each other. The pin extensions 158 are also radially spaced apart from the opening 160. The pin extensions 158 are configured to be received within the through holes 136 of the arbor head 118. The pin extensions 158 are further configured to engage with first locking shoulders 138 of the ring member 124 of the arbor head 118, to couple the adapter 142 with the arbor head 118 and thereby, couple the hole saw 140 to the arbor 106 during drilling operation.

The hole cutting tool 100 further includes a pilot guide 162 configured to engage the workpiece 104 during drilling operation. The pilot guide 162 provides anchor support to the hole saw 140 to make a hole in the workpiece 104. In an embodiment, the pilot guide 162 includes a pilot drill configured to make a small diameter hole in the workpiece 104 before the hole saw 140 makes the desired diameter hole in the workpiece 104. In another embodiment, the pilot guide 162 may include a tubular body 187 having a pointed end that engages with a preformed hole in the workpiece 104.

The pilot guide 162 includes a cutting portion 164 and a shank portion 166 extending from the cutting portion 164. The cutting portion 164 includes a plurality of cutting edges 168 configured to shear material from the workpiece 104. The cutting portion 164 has a diameter 'D1'. The shank portion 166 includes an ejection shoulder 170. The ejection shoulder 170 has a diameter 'D2' greater than the diameter 'D1' of the cutting portion 164. Further, the shank portion 166 includes a first end 172 proximate the cutting portion 164 and a second end 174 distal to the cutting portion 164. The shank portion 166 includes a detent 176 at the first end 172 and a locking groove 178 at the second end 174.

The pilot guide 162 is configured to be partially received within the second central bore 112 of the arbor 106. The pilot guide 162 is configured to translate between a first drilling position (shown in FIG. 3A) and a second ejection position (shown in FIG. 4A). In the first drilling position, the shank portion 166 of the pilot guide 162 is disposed within the second central bore 112 of the arbor 106 and in the second ejection position, at least a portion of the shank portion 166 of the pilot guide 162 extends outside from the second central bore 112 of the arbor 106. In an embodiment, in the second ejection position both the pilot guide 162 and the hole saw 140, are disposed away from the arbor 106, along the central axis X-X. In an embodiment, the first ejection position of the hole saw 140 corresponds to the second ejection position of the pilot guide 162, therefore the first ejection position of the hole saw 140 may be interchangeably referred to as the second ejection position.

Referring to FIG. 2 only, the hole cutting tool 100 further includes a locking tongue 180 disposed within the arbor head 118. The locking tongue 180 is actuatable between a first position, a second position and a third position. In the first position, the locking tongue 180 engages with the pilot guide 162 to prevent a translational and rotational movement of the pilot guide 162 in the first drilling position, and wherein in the second position, the locking tongue 180 disengages from the pilot guide 162 to allow a translational movement of the pilot guide 162 between the first drilling position and the second ejection position, and wherein in the third position, the locking tongue 180 engages with the pilot guide 162 to prevent a translational movement of the pilot guide in the second ejection position.

Referring to FIG. 3A only, the pilot guide 162 is disposed in the first drilling position. In the first drilling position, the pilot guide 162, the second central bore 112 of the arbor 106, the opening 160 of the adapter 142 are coaxially aligned to each other along the central axis X-X. The cutting portion 164 of the pilot guide 162 is further received through the opening 160 of the adapter 142. The shank portion 166 of the pilot guide 162 is disposed within the second central bore 112 of the arbor 106. In using the hole saw, the cutting portion 164 of the pilot guide 162 extends out from the second central bore 112 at a predetermined distance from the hole saw 140. The predetermined distance may be less than a thickness of the work piece 104. In an embodiment, the pilot guide 162 is locked in the first drilling position by the locking tongue 180. More specifically, the locking tongue 180 engages within the detent 176 of the pilot guide 162, when the locking tongue 180 is in the first position, to prevent translational movement and rotational movement of the pilot guide 162 along the central axis X-X in the first drilling position.

Further, the ring member 124 is biased in the first angular position to engage with the adapter 142 of the hole saw 140. More specifically, in the first angular position, the pin extensions 158 of the adapter 142 are received in the through holes 136 of arbor head 118 of the arbor 106. Within the pin retaining member 132, the pin extensions 158 engage with the first locking shoulders 138 of the ring member 124 to attach the adapter 142 and thereby, the hole saw 140 with the arbor 106.

During drilling operation, the arbor 106 may receive power from the power tool 102 and transfer it to the hole saw 140 through the adapter 142. The arbor 106 further transfers the power to the pilot guide 162 through the locking tongue 180. Upon rotation of the adapter 142 and the pilot guide 162, the hole saw 140 cuts the plug 150 from the workpiece 104. The plug 150 may be received and coupled within the first open end 148 of the hole saw 140.

Figure 3B:
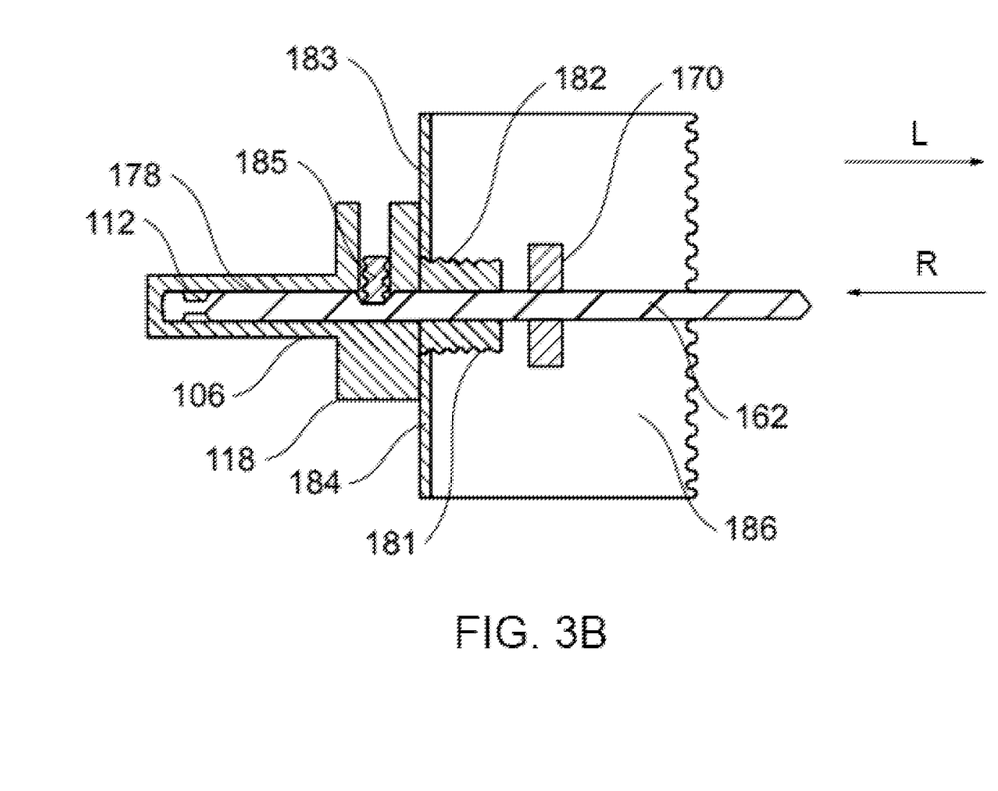
FIG. 3B is a schematic view of the hole cutting tool having the arbor with a threaded nose, in accordance with an exemplary embodiment of the present disclosure.

FIG. 3B illustrates a further embodiment of the current invention with the arbor 106 having a threaded nose 181 extending from the arbor head 118. A hole saw 140 has a thread 182 in end cap 183. The thread 182 in end cap 183 screws onto the threaded nose 181 to mount the hole saw which tightens against shoulder 184 of arbor head 118. The pilot guide 162 is securely mounted in arbor head 118 by tightening grub screw 185. The ejection shoulder 170 has a diameter 'D2' greater than the diameter 'D1' of the cutting portion 164 and greater than inner diameter of hole saw thread 182. The hole saw 140 can be unscrewed after cutting a hole. The hole saw 140 can then be moved away from the arbor 106 in direction of arrow B until hole saw end cap 183 abuts the ejection shoulder 170 of pilot guide 162. The grub screw 185 can be unscrewed to release pilot guide 162. With further movement of hole saw 140 in direction of arrow B, the hole saw end cap 183 abuts the ejection shoulder 170 of the pilot guide 162 pulling the pilot guide from inside the second central bore 112 until locking groove 178 aligns with the grub screw 185. The grub screw 185 can now be tightened to re-secure the pilot guide 162. The hole saw 140 can now be moved towards arbor 106 in direction of arrow A. It can be appreciated that as the pilot guide is secured it will remain stationary as the hole saw 140 is moved toward arbor 106 causing the ejection shoulder 170 to abut and expel the plug 150 left inside the hole saw cylinder 186. The grub screw can thereafter be unscrewed.

Figure 4A:
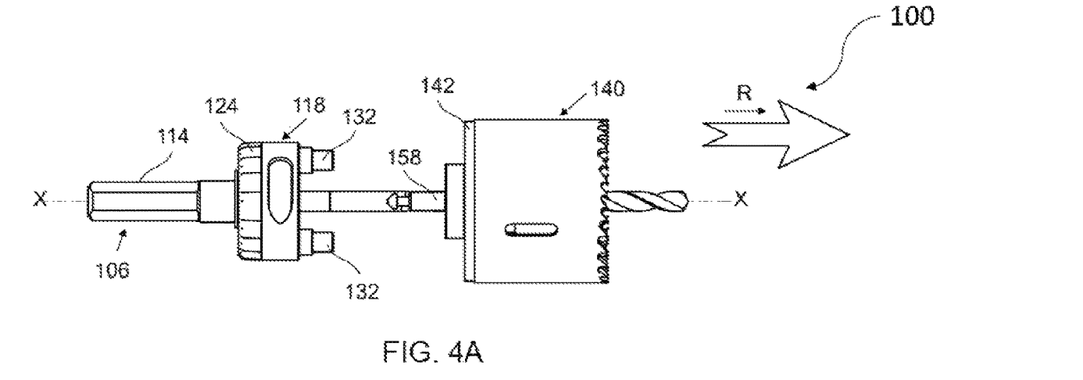
FIG. 4A is a schematic view of the hole cutting having the pilot guide in a second ejection position, in accordance with an exemplary embodiment of the present disclosure.
Figure 4B:
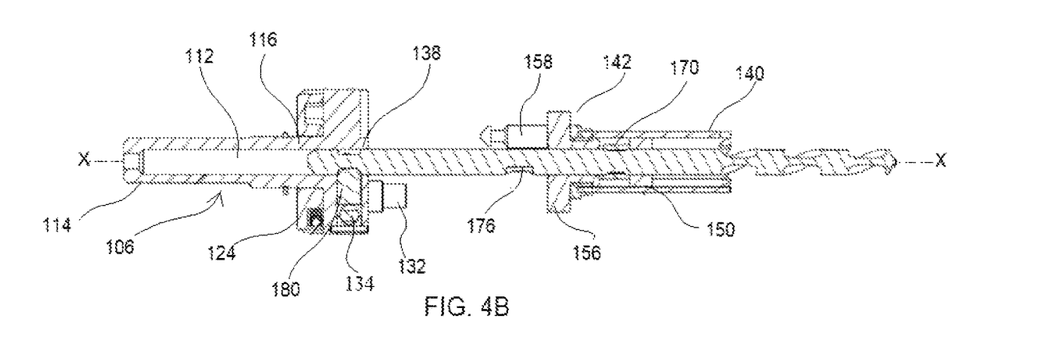
FIG. 4B is a sectional view of the hole cutting tool taken along a line A-A' in FIG. 4A, in accordance with an exemplary embodiment of the present disclosure.

FIG. 4A illustrates a schematic view of the hole cutting tool 100 having the pilot guide 162 in the second ejection position. FIG. 4B illustrates a sectional view of the hole cutting tool 100 taken along a line A-A' in FIG. 4A. Referring to FIGS. 4A & 4B, the pilot guide 162 is slidably received within the second central bore 112 of the arbor 106. The pilot guide 162 is configured to translate within the second central bore 112 along the central axis X-X from the first drilling position to the second ejection position. In an embodiment, the pilot guide 162 translates away from the arbor 106 in a direction 'R' towards the second ejection position. In the second ejection position, at least a portion of the shank portion 166 of the pilot guide 162 extends outside the second central bore 112 of the arbor 106. In an embodiment, the second end 174 of the shank portion 166 is disposed within the second central bore 112 of the arbor 106 and the first end 172 of the shank portion 166 is disposed outside the second central bore 112 of the arbor 106.

To translate the pilot guide 162 within the second central bore 112 of the arbor 106, the locking tongue 180 may be actuated from the first position to the second position. In the second position, the locking tongue 180 disengages from the detent 176 of the pilot guide 162 to allowing translation movement of the pilot guide 162 in the direction 'R'. In an embodiment, the push button mechanism 134 may be depressed to actuate the locking tongue 180 from the first position to the second position.

Further, as shown in FIG. 4B, the locking tongue 180 may be actuated from the second position to the third position, when the pilot guide 162 is in the second ejection position. In an embodiment, the locking tongue 180 may be configured to actuate from the second position to the third position, based on biasing forces of the spring member. In the third position, the locking tongue 180 engages into the locking groove 178 of the pilot guide 162, to prevent translational movement of the pilot guide 162 along the central axis X-X in the first drilling position.

Figure 5A:
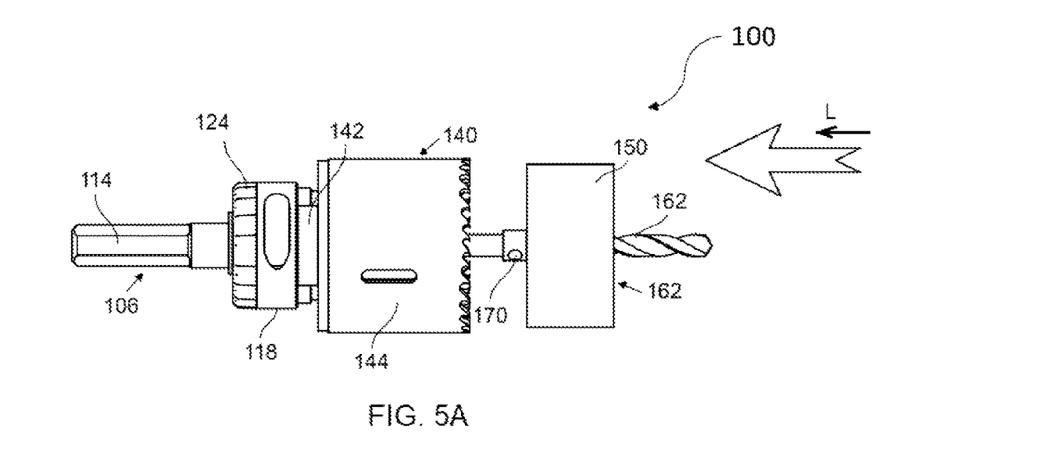
FIG. 5A is a schematic view of the hole cutting tool showing the hole saw in a first ejection position while the pilot guide is in the second ejection position, in accordance with an exemplary embodiment of the present disclosure.
Figure 5B:
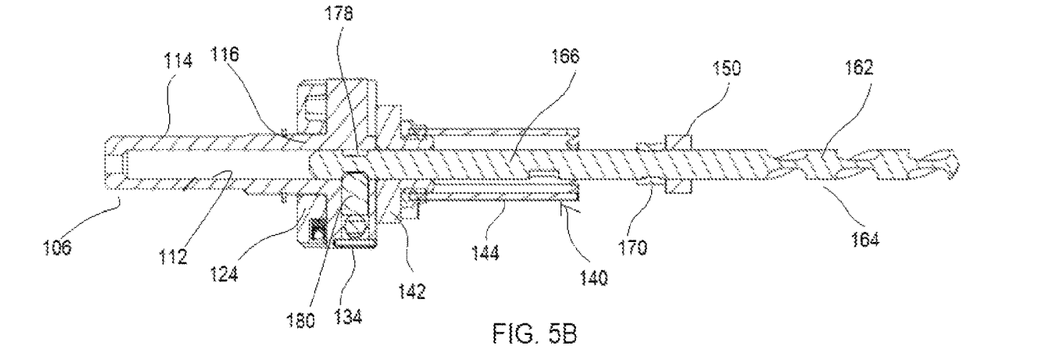
FIG. 5B is a sectional view of the hole cutting tool taken along a line B-B' in FIG. 5A, in accordance with an exemplary embodiment of the present disclosure.

FIG. 5A is a schematic view of the hole cutting tool 100 showing the hole saw 140 in the first ejection position while the pilot guide 162 is in the second ejection position. FIG. 5B is a sectional view of the hole cutting tool 100 taken along a line B-B' in FIG. 5A. Referring to FIGS. 5A & 5B, the hole saw 140 is configured to translate towards the arbor 106 onto the pilot guide 162 along the central axis X-X in a direction 'L', when the pilot guide 162 is locked in the second ejection position and the locking tongue 180 is in the third position. In an embodiment, the hole saw 140 translates in the direction 'L' opposite to the direction 'R'. The hole saw 140 may translate towards the arbor 106 along the direction 'L' to engage with the arbor head 118. During translational movement of the hole saw 130 in the direction 'L' towards the arbor 106, the ejection shoulder 170 of the pilot guide 162 abuts the plug to eject the plug 150 from the hole saw 140, while the pilot guide is locked in the second ejection position. In an embodiment, the hole saw 140 may be translated to be locked with the arbor head 118 for further drilling operation.

INDUSTRIAL APPLICABILITY

As described earlier, the plug 150 binds within the hole saw 140 after cutting from the workpiece 104 during drilling operation. The arbor 106 of the present disclosure allows ejection of the plug 150 from the hole saw 140 by allowing simultaneous translation of the pilot guide 162 and the hole saw 140 away from the arbor 106. The arbor further allows subsequent translation of the hole saw 140 towards the arbor in the first ejection position, while the pilot guide 162 is locked in second ejection position, to eject the plug 150 from the hole saw 140.

Figure 6:
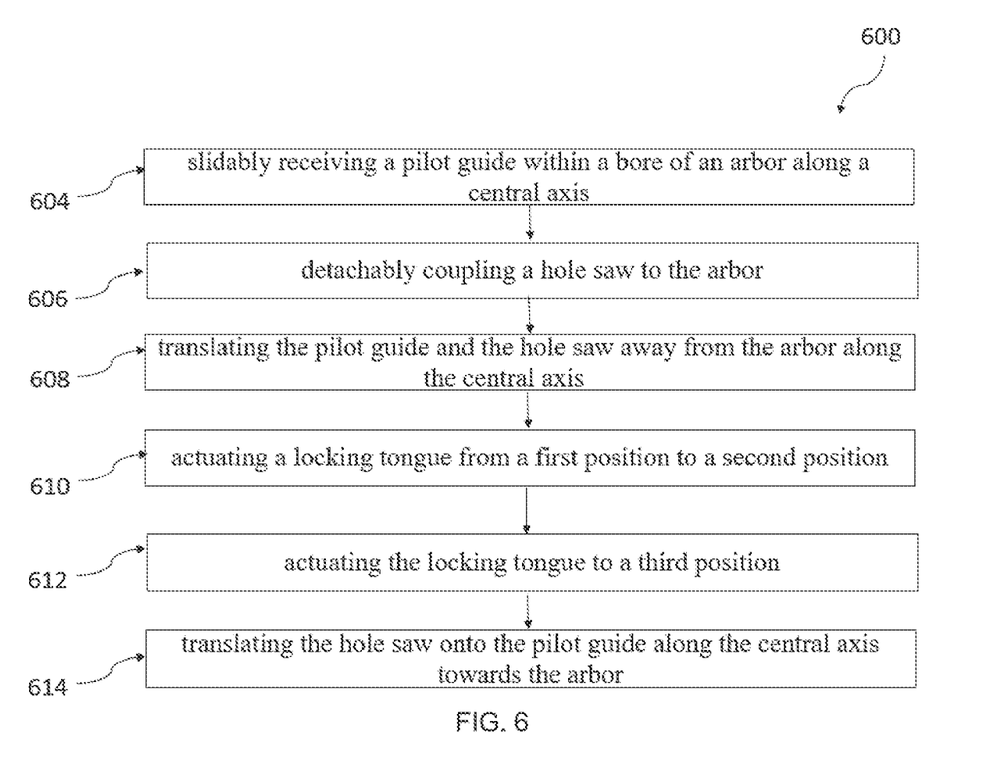
FIG. 6 is a flowchart of a method for ejecting plug from the hole cutting tool, in accordance with an exemplary embodiment of the present disclosure.

FIG. 6 illustrates a flowchart of a method 600 of operating the hole cutting tool 100. The method 600 is described in conjunction with FIG. 1 to FIG. 5B. In an implementation, the method 600, at step 604, includes slidably receiving the pilot guide 162 within the second central bore 112 of the arbor 106 along the central axis X-X. The pilot guide 162 is configured to translate between a drilling position and an ejection position. In an embodiment, the drilling position is referred to as a first drilling position and the ejection position is referred to as a second ejection position.

At step 606, the method 600 includes detachably coupling the hole saw 140 to the arbor 106. The hole saw 140 is configured to translate along the pilot guide 162 in the direction 'R' along the central axis X-X. In an embodiment, the hole saw 140 is coupled to the arbor head 118 mounted on the arbor 106, through the adapter 142. The ring member 124 of arbor head 118 may be configured to actuate between the first angular position in which the hole saw 140 is attached to the arbor 106 and the second angular position in which the hole saw 140 is detached from the arbor 106.

At step 608, the method 600 includes translating the hole saw 140 and the pilot guide 162 away from the arbor 106 along the central axis X-X. The hole saw 140 and the pilot guide 162 are configured to simultaneously translate in the direction 'R' away from the arbor 106. Specifically, the hole saw 140 is configured to translate from the first cutting position to the first ejection position, while the pilot guide 162 is configured to translate from the first drilling position to the second ejection position.

At step 610, the method 600 also includes actuating the locking tongue 180 from the first position to the second position to translate the pilot guide 162 from the first drilling position to the second ejection position. In the first position, the locking tongue 180 engages with the pilot guide 162 to prevent the translational and rotational movement of the pilot guide 162 in the first drilling position. In the second position, the locking tongue 180 disengages from the pilot guide 162 to allow a translational movement of the pilot guide 162 between the first drilling position and the second ejection position.

At step 612, the method 600 includes actuating the locking tongue 180 from the second position to the third position. In the third position, the locking tongue 180 engages with the pilot guide 162 to prevent the translational movement of the pilot guide 162 in the second ejection position.

At step 614, the method 600 includes translating the hole saw 140 towards the arbor 106 along the central axis X-X, when the pilot guide 162 is locked in the second ejection position and the locking tongue 180 is in the second position, to eject the plug 150 from the hole saw 140. In an embodiment, the pilot guide 162 includes the ejection shoulder 170 configured to abut the plug 150 when hole saw 140 is translated in the direction 'L' towards the arbor 106. Specifically, when the pilot guide 162 is in the second ejection position, movement of the hole saw 140 from the first cutting position to the second ejection position and then back towards the first cutting position causes the ejection shoulder 170 to abut the waste matter 150 in the first central bore 141, to eject the waste material 150 from the hole saw 140.

In various embodiments, the method 600 may include an additional step of actuating the locking tongue 180 from the third position to the second position to translate the pilot guide 162 back into the first drilling position. The pilot guide 162 may be configured to slide within the second central bore 112 of the arbor 106 in the direction 'L' to the first drilling position. Subsequently, the locking tongue 180 may be actuated from the second position to the first position to prevent any translational movement of the pilot guide 162 for further drilling operation.

All terminologies used herein is for mere purpose of describing embodiments and examples and should not be construed as limiting the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

While aspects of the present disclosure have been particularly shown and described with reference to the embodiments above, it will be understood by those skilled in the art that various additional embodiments may be contemplated by the modification of the disclosed methods without departing from the spirit and scope of what is disclosed. Such embodiments should be understood to fall within the scope of the present disclosure as determined based upon the claims and any equivalents thereof.

What is claimed is:

1. A hole cutting tool, comprising:
a hole saw having a first central bore;
an arbor having an arbor body, the arbor body defining a second central bore along a central axis, the arbor being configured at one end to be coupled to a rotational drilling machine, and at the other end to be attached to the hole saw in a first cutting position of the hole saw and detached from the hole saw in a second ejection position of the hole saw;
a pilot guide having an ejection shoulder, the pilot guide being slidably disposed within the second central bore of the arbor and received through the first central bore of the hole saw, the pilot guide being configured to translate along the central axis between a first drilling position and the second ejection position;
wherein the arbor comprises a locking means to rotationally secure the pilot guide in the second central bore as well as to prevent longitudinal movement of the pilot guide along the central axis,
wherein the locking means further comprises:
an adapter coupled to the hole saw, the adapter having a opening;
ring member rotatably mounted on the arbor, the ring member being configured to detachably couple the adapter to the arbor, wherein the ring member comprises a plurality of first locking shoulders angularly spaced from each other;
an arbor head engaged with the ring member to allow rotational movement of the ring member; and
a locking tongue disposed within the arbor head,
wherein in the first drilling position, the locking tongue engages with the pilot guide and in the second ejection position, the locking tongue disengages from the pilot guide to allow a translational movement of the pilot guide between the first drilling position and the second ejection position, and
wherein when the pilot guide is in the second ejection position, movement of the hole saw from the second ejection position to the first cutting position causes the ejection shoulder to abut waste material in the first central bore, to eject the waste material from the hole saw.

2. The tool of claim 1, wherein
the locking tongue being actuatable between a first position, a second position, and a third position,
wherein in the first position, the locking tongue engages with the pilot guide to prevent a translational movement and rotational movement of the pilot guide in the drilling position, and wherein in the second position, the locking tongue disengages from the pilot guide to allow a translational movement of the pilot guide between the drilling position and the ejection position, and wherein in the third position, the locking tongue engages with the pilot guide to prevent a translational movement of the pilot guide in the ejection position.

3. The tool of claim 1, wherein the pilot guide comprises:
a cutting portion; and
a shank portion extending from the cutting portion, wherein the shank portion is disposed within the bore of the arbor in the drilling position and wherein at least a portion of the shank portion extends outside from the bore of the arbor in the ejection position.

4. The tool of claim 3, wherein the ring member is kept at the first angular position to engage with the adapter and couple the hole saw to the arbor while cutting a hole.

5. The tool of claim 4, wherein the hole saw is translatable towards the arbor onto the pilot guide along the central axis to eject waste material stuck in the hole saw, when a pilot pin is locked in the second ejection position and the locking tongue is in the third position.

6. The tool of claim 3, wherein the hole saw, and the pilot guide are configured to translate simultaneously away from the arbor along the central axis, when the ring member is in the second angular position and the locking tongue is in second position.

7. The tool of claim 6, wherein
the cutting portion extending from the shank portion, the cutting portion including a shoulder having a diameter greater than a diameter of the cutting portion,
wherein the shoulder abuts the waste material during translation movement of the hole saw onto the shank portion towards the arbor.

8. The tool of claim 1, wherein the ring member is configured to rotate between a first angular position and a second angular position, and wherein in the first angular position, the arbor head engages with the adapter to attach the hole saw to the arbor, and in the second angular position, the arbor head disengages from the adapter to allow a free translational movement of the hole saw along the central axis.

9. The tool of claim 1, wherein the pilot guide is locked in the first drilling position and the locking tongue is actuated in first position during a drilling operation.

10. The tool of claim 1, wherein the pilot guide is configured to translate away from the arbor along the central axis to the second ejection position while the locking tongue is actuated in the second position.

11. The tool of claim 1, wherein the pilot guide is configured to be locked in the second ejection position when the locking tongue is actuated in the third position.

12. The tool of claim 1, wherein the pilot guide, the bore of the arbor, and a central through bore of the adapter are coaxially aligned to the central axis.

13. The tool of claim 1, wherein the pilot guide comprising:
a cutting portion; and
a shank portion extending from the shank portion, the shank portion having a detent at a first end proximate the cutting portion and a locking groove at a second end distal to the cutting portion,
wherein the locking tongue engages with the detent in the drilling position and the locking tongue engages with the locking groove in the ejection position.

14. The tool of claim 1, wherein the adapter comprises at least one extension pins configured to be removably received within a hole of the arbor head to couple the adapter with the arbor head.

15. The tool of claim 1, wherein the pilot guide comprises a pilot drill configured to make a hole.

16. The tool of claim 1 further comprising a push-button to actuate the locking tongue between the first position and the second position.

* * * * *